United States Patent [19]

Tybus et al.

[11] 4,263,026
[45] Apr. 21, 1981

[54] GAS MIXTURE SEPARATION APPARATUS

[75] Inventors: Gerd Tybus, Poing; Hartmut Neuking, Munich, both of Fed. Rep. of Germany

[73] Assignee: Messerschmitt-Bölkow-Blohm Gesellschaft mit beschraankter Haftung, Munich, Fed. Rep. of Germany

[21] Appl. No.: 36,672

[22] Filed: May 7, 1979

[30] Foreign Application Priority Data

May 12, 1978 [DE] Fed. Rep. of Germany ....... 2820738

[51] Int. Cl.³ .................. B01D 45/04; B01D 57/00
[52] U.S. Cl. ........................... 55/344; 55/17; 55/392; 55/DIG. 14
[58] Field of Search .............. 55/17, 342, 344, 392, 55/397, 410, 484, 529, DIG. 14

[56] References Cited

U.S. PATENT DOCUMENTS

| 1,970,077 | 8/1934 | Collins | 55/344 |
|---|---|---|---|
| 2,648,398 | 8/1953 | Chipley | 55/17 |
| 3,362,131 | 1/1968 | Becker et al. | 55/17 |
| 3,957,470 | 5/1976 | Dawes | 55/529 |
| 4,033,021 | 7/1977 | Tybus et al. | 55/17 |
| 4,141,699 | 2/1979 | Anderson | 55/17 |

FOREIGN PATENT DOCUMENTS

| 1060846 | 7/1959 | Fed. Rep. of Germany | 55/17 |
|---|---|---|---|
| 147189 | 1/1922 | United Kingdom | 55/17 |

OTHER PUBLICATIONS

Atomwirtschaft, pp. 524–527, Nov. 1973.

*Primary Examiner*—David L. Lacey
*Attorney, Agent, or Firm*—Toren, McGeady and Stanger

[57] ABSTRACT

Apparatus for separating a gas mixture into components of different molecular weights includes two laterally spaced tubular members with a plurality of pairs of sections extending between the tubular members. The sections of each pair combine to form a flow passageway with the adjacent edges of the sections defining nozzles. The pairs of sections are arranged to form a cluster of star-shaped members. Each star-shaped member is formed of four pairs of sections with each pair extending perpendicularly to the adjacent pairs. Adjacent star members have a common pair of sections. At the junction point of the four pairs of sections in each star-shaped member, a separation space is provided into which the nozzles are directed.

9 Claims, 2 Drawing Figures

ABSTRACT OMITTED - starting content

GAS MIXTURE SEPARATION APPARATUS

SUMMARY OF THE INVENTION

The present invention is directed to an apparatus for separating the different molecular weight components of a gas mixture by the mutual deflection of jets of the gas mixture directed toward one another.

For the separation of this type of gas mixture, the principle of separating nozzles has been known in which centrifugal force is used in a high velocity arcuate flow path. Initially, the gas mixture is directed at a stationary wall with separation taking place between the lighter fractions which are not displaced outwardly in the curved flow path to the extent of the heavier fractions.

Since friction losses occur at the deflection walls such losses have a negative influence on the separation of the mixture, accordingly, it has been proposed to effect separation by the mutual deflection of two gas jets directed toward one another, in this connection note Ehrfeld, U.K. Knapp, Institut für Kernverfahrenstechnik, (Institute for Nuclear Process Technology), Karlsruhe, KFK 2138 of March, 1975.

Therefore, it is the primary object of the present invention to provide an apparatus utilizing the mutual deflection of gas jets which allows economical throughputs with the possibility of high productivity and, further, which effects the separation of the gas mixture in a simple manner.

In accordance with the present invention, eight sections disposed in four pairs of sections are arranged to form a star-shaped member with the adjacent pairs of sections being spaced angularly apart by 90°. The edges of the sections in each pair provide nozzles. Each pair of sections forms an inner gas guide passageway or channel. The outer surfaces of the sections combine to form an outer gas guide passageway. The star-shaped members are arranged in a cluster and the edges of the pairs of sections extending along the periphery of the cluster are sealed together in a gas-tight manner. The remaining edges of the pairs of sections are arranged to form nozzles with each nozzle directed toward the junction point of a star-shaped member so that the junction point forms a separation space.

An advantageous feature of the use of a cluster of the star-shaped members is that each pair of adjoining members has a common pair of sections.

To support the sections in a simple manner secured against displacement and, at the same time, to control the supply and discharge of the gas into and out of the pair of sections, in accordance with the present invention, the pairs of sections are positioned between two tubular members, one serving for the supply of the gas and the other for its discharge. The pairs of sections are held between the tubular members by interconnecting the tubular members and forcing them toward one another. Each tubular member has openings which serve as gas mixture inlets or outlets into or out of the flow passageways formed by the pairs of sections.

Positioning pins mounted in the facing surfaces of the tubular members afford the accurate permanent positioning of the sections relative to one another.

The inlet and outlet openings in the tubular sections are shaped to provide the optimum flow conditions for introducing the gas into and removing it from the flow passageways.

Additional features of the apparatus are disclosed in its detailed description.

The apparatus can be produced economically due, in particular, to the fact that all of the sections have the same shape and can be formed inexpensively by cutting operations or other suitable techniques.

Because of the simple construction utilized, depending on the amount of gas to be separated, it is possible to provide additional sections of the apparatus around an existing section.

The arrangement of the pairs of sections is particularly efficient since, with the exception of the pairs located on the periphery of a cluster, all of the pairs forming the star-shaped members afford separation spaces. Additionally, the space containing the cluster of star-shaped members is utilized most efficiently.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
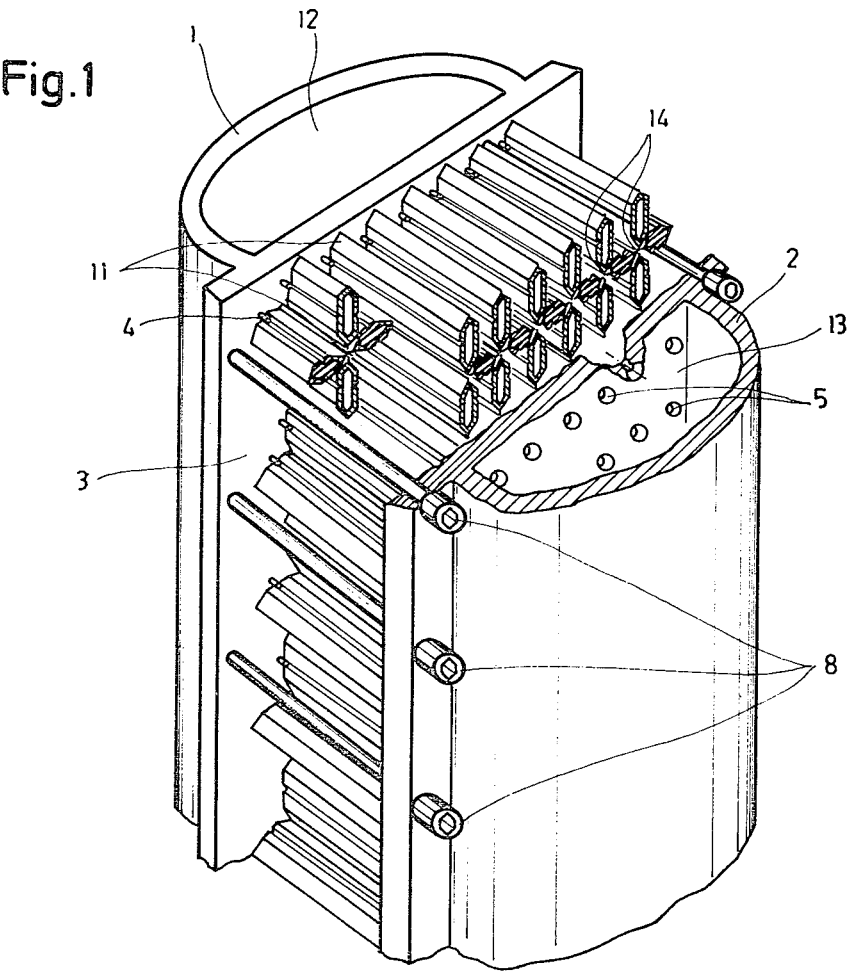
FIG. 1 is a perspective view of an apparatus embodying the present invention.

As illustrated in FIG. 1, the essential components of the gas mixture separating apparatus are the tubular members 1, 2 disposed in laterally spaced relation with the pairs of sections 9a-9b-9c-9d and the like which extend between the two tube sections and are arranged in pairs forming a cluster of star-shaped members 11. Elongated tension members 8 extend between the tubular members 1, 2 and by means of threaded parts the tension members draw the tubular members toward one another for locking the pairs of sections between them.

As can be seen in FIG. 1, pins 4 are inserted into the flat or planar surfaces 3 of each of the tubular members so that four of the pins position a pair of sections at the planar surface. The tubular members 1, 2 each have a plurality of openings 5 therethrough which are shaped to provide the desired flow characteristic of the gas mixture entering into or exiting from the gas passageways provided within each pair of sections. The exterior shape of the tubular members 1, 2 are selected so that the openings 5 are connected to a gas mixture supply chamber 12 in tubular member 1 or to a gas discharge chamber 13 for the heavier gas components of the mixture in the tubular member 2.

Figure 2:
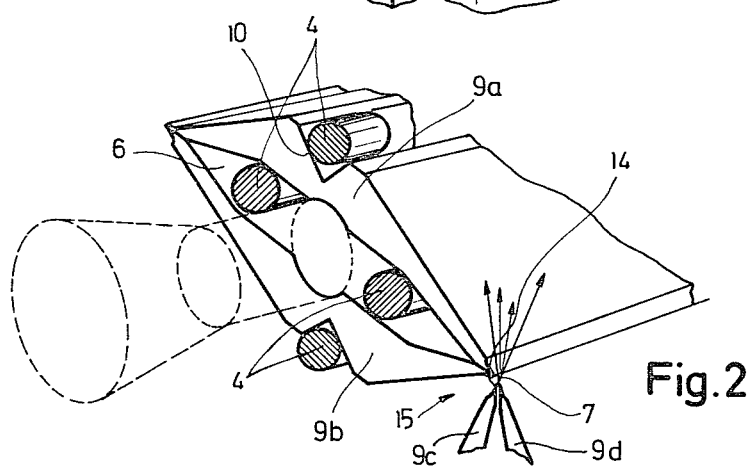
FIG. 2 is an enlarged detail view illustrating the arrangement of the sections.

In FIG. 2 a pair of sections 9a, 9b are shown in detail to indicate the manner in which they are positioned relative to one another. Each of the sections has the same shape or configuration. When joined together as a pair and held by the pins 4, the sections have a slightly concave inner surface and a slightly convex outer surface. The concave surfaces of a pair form an inner gas guide duct 6 within the sections 9a, 9b. The sections have an elongated direction extending between the two tubular members 1,2. From the center of the duct 6 toward the opposite edges the inner surfaces of the sections converge forming narrower portions into which the positioning pins 4 are inserted for supporting and spacing the inner surfaces of the sections and providing nozzles 7 extending along each of the elongated edges of each pair of sections. The necessary countersupport of the sections is provided by a pin 4 which seats into a V-shaped groove or recess in the outer surface of each section. As can be seen in FIG. 2 four pins support and shape each end of the pairs of elements 9a, 9b. Further, in FIG. 2, an opening 5 through one of the tubular members 1, 2 is shown in dashed lines providing access to the flow passageway or duct 6 within the pair of sections 9a, 9b.

As shown in FIG. 1, four pairs of sections are arranged to form a star-shaped member so that in each member the pairs of elements are spaced angularly apart by 90°. The junction point or center of each star-shaped member forms a separation space 14, note FIG. 2. The star-shaped members 11 are arranged in a cluster forming vertical and horizontal rows so that each adjacent pair of star-shaped members share a common pair of sections. This arrangement occurs in both the vertical and horizontal directions as viewed in FIG. 1. The cluster of star-shaped members has an outer periphery extending between the two tubular sections 1, 2. Only the pairs of sections which have an elongated edge located in the periphery are sealed in a gas-tight manner while the remaining edges of all of the pairs of sections spaced inwardly from the periphery are open forming nozzles. Accordingly, each pair of sections has two edges and each of its edges opens to a separation space 14 formed by a different star-shaped member.

The end faces of the pairs of sections are located in the planes of the planar surfaces 3 of the tublar sections 1, 2 so that the ducts or passageways 6 within the pairs of sections are provided either for receiving a supply of the gas mixture or for discharging the gas. In the region of the planar surfaces 3, the sections can be shaped to provide a favorable flow-dynamic transition to the openings 5 in the tubular members 1, 2.

In operation, the gas mixture flows from the supply chamber 12 in tubular member 1 through openings, not shown, into certain of the inner passageways 6. In the drawing, the inlet supply of the gas mixture is introduced into the horizontally arranged pairs of sections. From the flow passageway 6 within the horizontally extending pairs of sections, the gas mixture flows through the nozzles 7 provided by the elongated edges of the sections. As a result of the confronting jet action of two horizontally arranged pairs of sections, the heavier components of the gas mixture enter the passageways 6 in the vertically arranged pairs of sections and flow from these passageways into the gas discharge chamber 13 in tubular member 2.

From the separation space 14, the lighter components of the gas mixture are discharged through the guide duct 15 formed between the outer surfaces of the pairs of elements in adjacent star-shaped members 11. The lighter components of the gas mixture within the outer guide ducts 15 can be removed from these spaces by suction or the like.

The apparatus can be enlarged in a simple manner by combining similar apparatuses arranged one on top of another or next to one another and supported by tie rods.

What is claimed is:

1. Apparatus for the separation of the components of different molecular weights in a gas mixture by means of mutual deflection of jets of the gas mixture directed toward one another, comprising a first tubular member and a second tubular member being disposed in laterally spaced relation, each said first and second tubular member having a flow axis with the flow axes extending in generally parallel relation, each said first and second tubular members having an axially extending planar surface with said planar surfaces facing one another in spaced apart relation, said first tubular member forming a gas supply chamber and said second tubular member forming a gas discharge chamber, a plurality of elongated sections extending between said planar surfaces of said first and second tubular members, each said section having an inner surface, an outer surface, a pair of spaced edges extending along the inner and outer surfaces in the elongated direction of said sections between said planar surfaces of said first and second tubular members, and a first end and a second end each extending transversely of the elongated direction of said sections with the first end abutting against said planar surface of said first tubular member and the second end abutting against said planar surface of said second tubular member, a pair of said sections arranged in opposed relation with the inner surfaces thereof facing one another and forming a flow passage therebetween extending in the elongated direction of said sections between said planar surfaces of said first and second tubular members, at least one pair of adjacent edges of each said pair of sections disposed in closely spaced relation and forming a nozzle therebetween communicating with the flow passage formed within said pair, four said pairs of sections arranged to form a star-shaped member with the inner and outer surfaces of two of said pairs extending transversely of the inner and outer surfaces of the other two of said pairs and said four said pairs having a central junction line extending between said planar surfaces of said first and second tubular member with each said pair of sections forming said star-shaped member extending outwardly from the junction line and being spaced angularly apart from the adjacent said pairs by approximately 90°, each said pair of sections in said star-shaped member having a pair of edges located at and extending along the junction line of the four said pairs of said sections with the nozzles formed by each said pair at the junction line facing the nozzle on the other said pair spaced 180° therefrom, the nozzles at the junction line of said star-shaped member bounding a separation space for the gas mixture and the outer surfaces of said sections in each said pair of sections forming said star-shaped member defining one surface of an outer guide duct, and in each said star-shaped member the flow passageways of two said pairs spaced 180° apart are connected to said gas supply chamber and the other two said pairs spaced 180° apart are connected to said gas discharge chamber.

2. Apparatus, as set forth in claim 1, wherein a plurality of said star-shaped members are arranged in a cluster with said elements forming said star-shaped members extending in the same direction and the cluster having an outer periphery extending around the cluster and in the elongated direction of said elements forming said star-shaped members, and the adjacent edges of said elements forming said pairs of elements located on the periphery of the cluster being closed and the adjacent edges of said pairs of elements located inwardly of the periphery being open and forming nozzles directed toward the separation space located at the junction points of said star-shaped members.

3. Apparatus, as set forth in claim 2, wherein in said cluster of star-shaped elements each pair of adjacent said star-shaped members has a common said pair of elements.

4. Apparatus, as set forth in claim 1, further including connecting members extend between said first and second tubular members for forcing said first and second tubular members toward one another and securing said pairs of sections therebetween.

5. Apparatus, as set forth in claim 4, wherein said openings in said first tubular member are shaped to provide dynamic flow therethrough into the flow passageways in said pairs of sections connected thereto.

6. Apparatus, as set forth in claim 1, wherein positioning pins are mounted in said planar surfaces of said first and second tubular members and extend therefrom toward said sections located therebetween, and said position pins support the first and second ends of said sections and hold said sections for forming said pairs of sections in spaced relation forming said flow passagews therewithin.

7. Apparatus, as set forth in claim 6, wherein the inner surfaces of said sections are concave and the outer surfaces of said sections are convex, a groove formed in the outer surface of each of said sections and extending in the elongated direction of said sections and spaced inwardly from each of the edges thereof, and one said positioning pin extending into each of the grooves.

8. Apparatus, as set forth in claim 7, wherein two said positioning pins extend into the flow passageway between each said pair of sections and each of the two said positioning pins is spaced inwardly from the adjacent edges of said pair of sections and outwardly from the center of the flow passageway between the edges thereof.

9. Apparatus, as set forth in claim 1, wherein said openings in said first tubular member are shaped to provide dynamic flow therethrough into the flow passageways in said pairs of sections connected thereto.

* * * * *